United States Patent
Sakai et al.

(10) Patent No.: US 7,297,426 B2
(45) Date of Patent: Nov. 20, 2007

(54) DIRECT METHANOL FUEL CELL SYSTEM, FUEL CARTRIDGE, AND MEMORY FOR FUEL CARTRIDGE

(75) Inventors: Hirotaka Sakai, Kawasaki (JP); Nobuo Shibuya, Hiratsuka (JP); Hiroyuki Hasebe, Chigasaki (JP); Norihiro Tomimatsu, Kawasaki (JP); Hiroyasu Sumino, Tokyo (JP); Hirohisa Miyamoto, Kamakura (JP); Masato Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 517 days.

(21) Appl. No.: 10/458,299

(22) Filed: Jun. 11, 2003

(65) Prior Publication Data

US 2004/0009381 A1    Jan. 15, 2004

(30) Foreign Application Priority Data

| Jun. 12, 2002 | (JP) | ............................. 2002-171520 |
| Sep. 6, 2002 | (JP) | ............................. 2002-260762 |
| Mar. 7, 2003 | (JP) | ............................. 2003-061872 |

(51) Int. Cl.
*H01M 8/04* (2006.01)
*H01M 2/00* (2006.01)
*H01M 8/00* (2006.01)

(52) U.S. Cl. .............................. 429/23; 429/9; 429/34; 429/12; 429/13

(58) Field of Classification Search ................. 429/12, 429/13, 34
See application file for complete search history.

(56) References Cited

U.S. PATENT DOCUMENTS

| 4,629,664 A | | 12/1986 | Tsukui et al. |
| 5,432,023 A | * | 7/1995 | Yamada et al. ................ 429/34 |
| 5,462,658 A | * | 10/1995 | Sem ........................... 210/172 |
| 6,122,908 A | * | 9/2000 | Wirmark ...................... 60/274 |
| 6,506,513 B1 | | 1/2003 | Yonetsu et al. |
| 6,840,272 B2 | * | 1/2005 | Hildreth, Jr. ................. 137/545 |
| 2003/0168023 A1 | * | 9/2003 | Anderson et al. .............. 123/3 |

FOREIGN PATENT DOCUMENTS

| JP | 10-507572 | 7/1998 |
| JP | 2001-93551 | 4/2001 |
| JP | 2001-95109 | 4/2001 |
| JP | 2002-32154 | 1/2002 |
| JP | 2002-161997 | 6/2002 |
| JP | 2003-45468 | 2/2003 |
| JP | 2003-142137 | 5/2003 |

* cited by examiner

*Primary Examiner*—Patrick Joseph Ryan
*Assistant Examiner*—Angela J. Martin
(74) *Attorney, Agent, or Firm*—Oblon, Spivak, McClelland, Maier & Neustadt, P.C.

(57) ABSTRACT

The invention provides a fuel cartridge for supplying methanol aqueous solution to a direct methanol fuel cell system, comprising a memory which stores at least a concentration of the methanol aqueous solution.

7 Claims, 7 Drawing Sheets

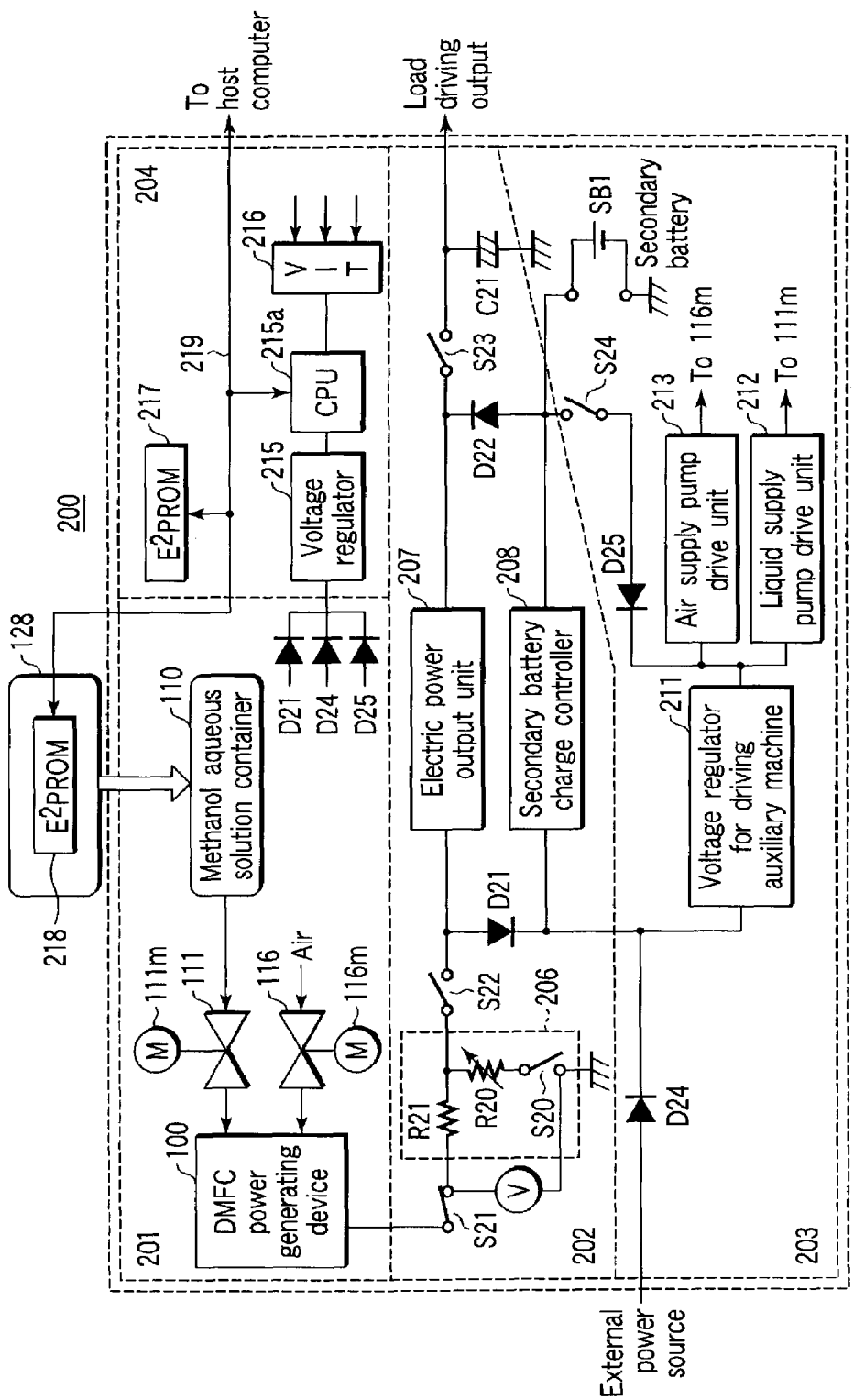
F I G. 2

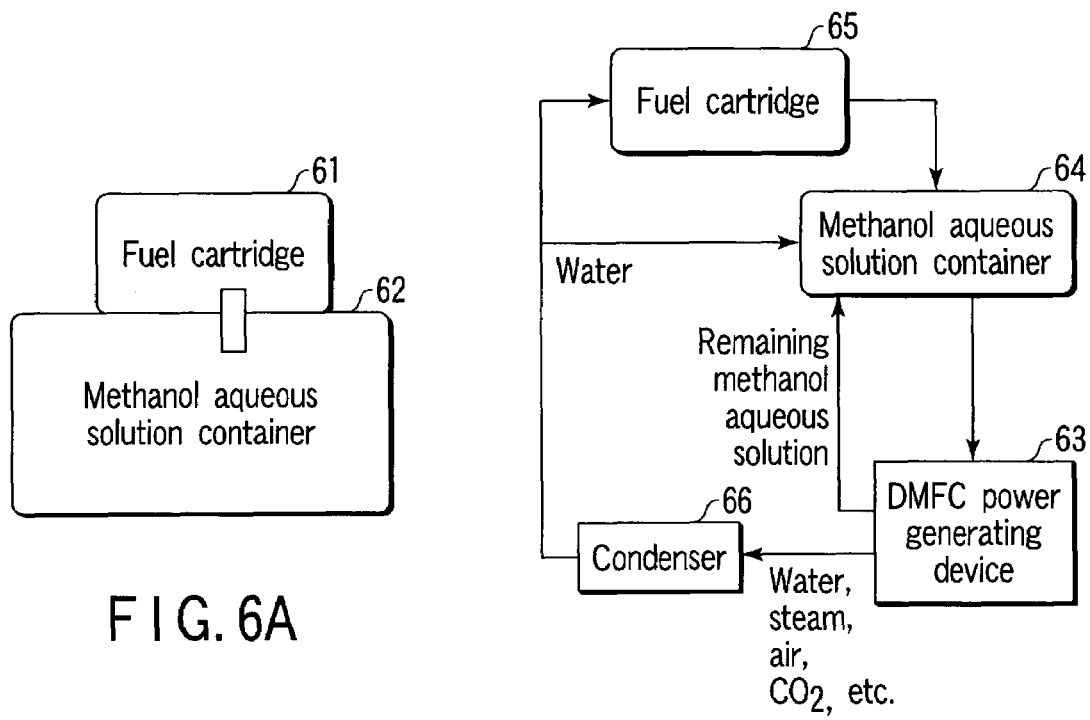
FIG. 6A
FIG. 6B
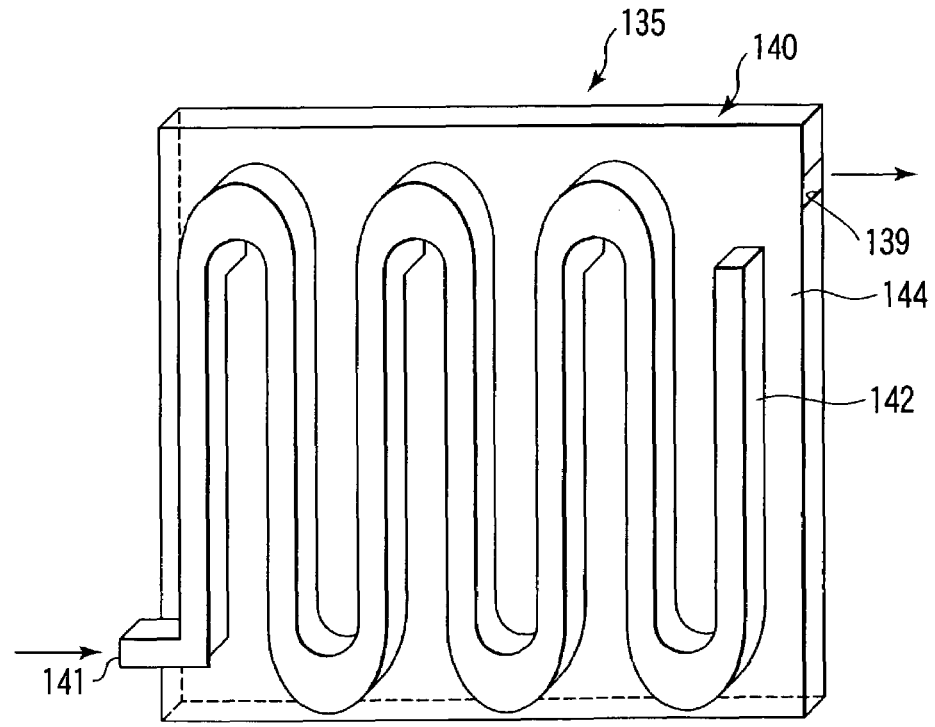
FIG. 8

DIRECT METHANOL FUEL CELL SYSTEM, FUEL CARTRIDGE, AND MEMORY FOR FUEL CARTRIDGE

CROSS-REFERENCE TO RELATED APPLICATIONS

This application is based upon and claims the benefit of priority from the prior Japanese Patent Applications No. 2002-171520, filed Jun. 12, 2002; No. 2002-260762, filed Sep. 6, 2002; and No. 2003-061872, filed Mar. 7, 2003, the entire contents of all of which are incorporated herein by reference.

BACKGROUND OF THE INVENTION

1. Field of the Invention

The present invention relates to a direct methanol fuel cell system capable of driving electronic appliances hitherto using a battery as driving power source such as small portable appliances.

2. Description of the Related Art

Recently, fuel cells have high expectations as a power source for use in portable electronic appliances supporting the age of information technology, or as measures against air pollution and global warming.

Of the various fuel cells, the direct methanol fuel cell (DMFC) for generating power by taking out protons directly from methanol has outstanding benefits, such as no need of a reformer, and small fuel amount, and its application in portable electronic appliances is being developed. It is thus expected to be applied in many fields.

As disclosed in Jpn. Pat. Appln. KOKAI Publication No. 2001-93551, a container for holding a liquid fuel of a direct methanol fuel cell is detachable, or is capable of being replenished with liquid fuel, and driving for a long period is realized while reducing the size of the fuel cell.

This type of direct methanol fuel cell is required to control the concentration of the methanol aqueous solution supplied as fuel, but the optimum concentration varies according to the load, which fluctuates, and the amount of the replenished methanol. The correct-supply amount in relation to an external load is not known unless actually operated for a long time, thus a practical direct methanol fuel cell capable of generating power stably for a long period has not been developed yet.

BRIEF SUMMARY OF THE INVENTION

The present invention is devised in the light of the problems of the conventional DMFC system, and it is hence an object thereof to provide a practical direct methanol fuel cell system capable of stably supplying electric power to a load over a long period, a fuel cartridge, and a memory for fuel cartridge.

According to a first aspect of the present invention, there is provided a direct methanol fuel cell system comprising:

a power generating unit which includes an anode electrode, a cathode electrode, and an electrolyte layer provided between the anode electrode and the cathode electrode;

a characteristic-measuring mechanism which measures one characteristic of a voltage characteristic and a current-voltage characteristic in the power generating unit; and an external load supply mechanism which supplies an electric power of the power generating unit to an external load on the basis of the one characteristic.

According to a second aspect of the present invention, there is provided a direct methanol fuel cell system comprising:

a power generating unit which includes an anode electrode, a cathode electrode, and an electrolyte layer provided between the anode electrode and the cathode electrode;

a variable resistor;

a resistor which detects a current flowing into the variable resistor from the power generating unit;

a voltage detection mechanism which detects a voltage of the power generating unit when the current flows in the variable resistor; and an external load supply mechanism which supplies an electric power of the power generating unit into an external load on the basis of a current-voltage characteristic.

According to a third aspect of the present invention, there is provided a direct methanol fuel cell system comprising:

a power generating unit which includes an anode electrode, a cathode electrode, an electrolyte layer provided between the anode electrode and the cathode electrode, an anode fluid channel which supplies methanol aqueous solution to the anode electrode, and a cathode fluid channel which supplies air to the cathode electrode;

a liquid supply mechanism which supplies methanol aqueous solution to the anode fluid channel;

an air supply mechanism which supplies air to the cathode fluid channel;

an auxiliary power source which drives the air supply mechanism and the liquid supply mechanism;

a variable resistor;

a resistor which detects a current flowing into the variable resistor from the power generating unit;

a voltage detection mechanism which detects a voltage of the power generating unit when the current flows in the variable resistor;

an external load supply mechanism which supplies an electric power of the power generating unit into an external load on the basis of a current-voltage characteristic; and a changeover mechanism which changes over between the auxiliary power source and the power generating unit on the basis of the voltage of the power generating unit.

According to a fourth aspect of the present invention, there is provided a direct methanol fuel cell system comprising:

a power generating unit which includes an anode electrode, a cathode electrode, an electrolyte layer provided between the anode electrode and the cathode electrode, an anode fluid channel which supplies methanol aqueous solution to the anode electrode, and a cathode fluid channel which supplies air to the cathode electrode;

a characteristic-measuring mechanism which measures a current-voltage characteristic of the power generating unit;

an external load supply mechanism which supplies an electric power of the power generating unit to an external load on the basis of the current-voltage characteristic;

a methanol aqueous solution container which stores methanol aqueous solution to be supplied to the anode fluid channel; and a fuel cartridge which stores methanol aqueous solution to be replenished in the methanol aqueous solution container.

According to a fifth aspect of the present invention, there is provided a fuel cartridge for supplying methanol aqueous solution to a direct methanol fuel cell system, comprising:

a memory which stores at least a concentration of the methanol aqueous solution.

According to a sixth aspect of the present invention, there is provided a memory for fuel cartridge for use in a direct methanol fuel cell system that comprises a container and a fuel cartridge from which accommodates methanol aqueous solution is to be supplied into the container, wherein the memory is fixed in the fuel cartridge, and a first information about the fuel cartridge, or a second information about the methanol aqueous solution is stored the memory.

According to an seventh aspect of the present invention, there is provided a direct methanol fuel cell system comprising:

a power generating unit including an anode electrode, a cathode electrode, and an electrolyte layer provided between the anode electrode and the cathode electrode;

a fuel tank which stores a fuel containing methanol; and a fuel cartridge comprising a spare fuel tank which stores a fuel that contains methanol and is to be replenished in the fuel tank, and a harmful substance trap member which traps harmful substances in a gas in the fuel tank.

According to a eighth aspect of the present invention, there is provided a fuel cartridge to be connected to a fuel tank of a direct methanol fuel cell, comprising:

a spare fuel tank which stores a fuel to be replenished in the fuel tank; and a harmful substance trap member which traps harmful substances in a gas in the fuel tank.

BRIEF DESCRIPTION OF THE SEVERAL VIEWS OF THE DRAWING

FIG. 2 is a diagram showing a circuit configuration example of the embodiment of the invention.

FIG. 6A is a diagram for explaining another embodiment of a methanol aqueous solution container and a fuel cartridge in the invention.

FIG. 6B is a diagram for explaining another embodiment of a methanol aqueous solution container and a fuel cartridge in the invention.

FIG. 8 is a perspective view schematically showing an example of a harmful substance trap member of the direct methanol fuel cell system in FIG. 7.

DETAILED DESCRIPTION OF THE INVENTION

It is a feature of the invention that the voltage or current-voltage characteristic of electric power generated by a power generating unit is measured so that the electric power is supplied to an external load on the basis of the characteristic.

In order to achieve the object, the invention provides a direct methanol fuel cell system comprising a power generating unit which generates electric power by chemical reaction between a methanol aqueous solution that is a fuel and passes in an anode fluid channel and air that is an oxidizer and passes in a cathode fluid channel, characteristic-measuring mechanism which measures the voltage or current-voltage characteristic of the electric power generated in the power generating unit, and external load supply mechanism which supplies the electric power of the power generating unit to an external load on the basis of the voltage or current-voltage characteristic measured by the characteristic-measuring mechanism.

Figure 1:
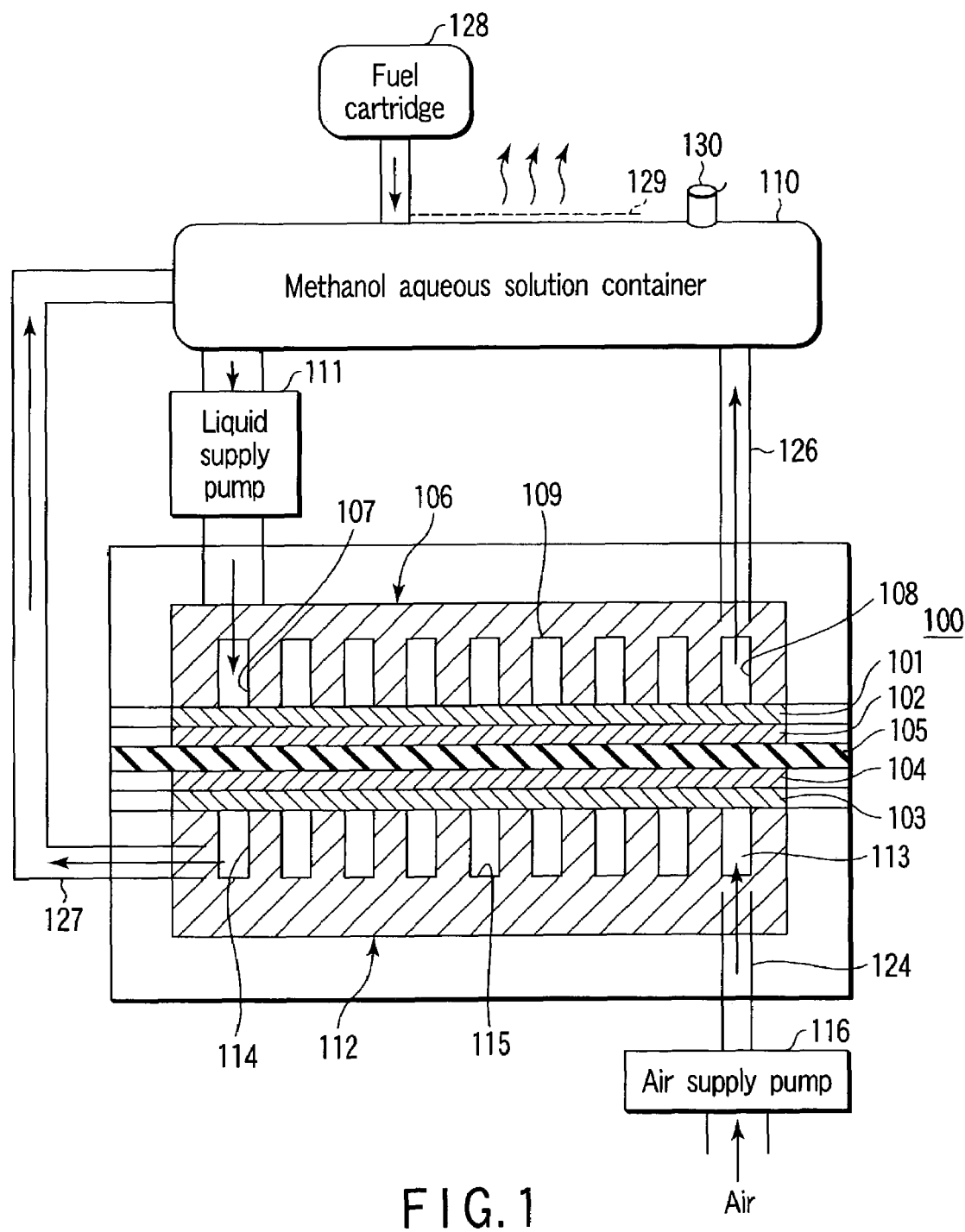
FIG. 1 is a diagram showing a structural example of a DMFC power generating device for use in an embodiment of the invention.

Preferred embodiments of the invention will be described below while referring to the accompanying drawings. FIG. 1 shows a DMFC power generating device for use in the invention and a mechanical structural example thereof, and FIG. 2 shows a structural example of the DMFC system in an embodiment of the invention.

A power generating unit of a direct methanol fuel cell (DMFC) power generating device 100 comprises an anode electrode including an anode current collector 101 and an anode catalyst layer 102, a cathode electrode including a cathode current collector 103 and a cathode catalyst layer 104, and an electrolyte layer 105 provided between the anode electrode and the cathode electrode. An anode fluid channel plate 106 is provided at the anode current collector 101 side, in which an anode fluid channel 109 having a methanol supply port 107 and a methanol discharge port 108 is formed. A methanol aqueous solution container 110 holding methanol aqueous solution is connected to the methanol supply port 107 of the anode fluid channel plate 106 by way of a liquid supply pump 111. The power generating device 100 is heated by a heater (not shown).

On the other hand, a cathode fluid channel plate 112 is provided at the cathode current collector 103 side of the power generating device 100, in which a cathode fluid channel 115 having an oxidizer supply port 113 and an oxidizer discharge port 114 is formed. An air supply pump 116 is connected to the oxidizer supply port 113, and an oxidizer such as air is sent into the oxidizer supply port 113 from outside.

Methanol aqueous solution is supplied into the methanol supply port 107 of the anode fluid channel plate 106 by the liquid supply pump 111 from the methanol aqueous solution container 110, and flows in the groove portion of the fluid channel plate, that is, the anode fluid channel 109. A convex portion of the anode fluid channel plate 106 is in contact with the anode current collector 101 such as anode carbon paper. When the methanol aqueous solution flowing in the anode fluid channel 109 soaks into the anode current collector 101, the methanol aqueous solution is supplied into the anode catalyst layer 102. However, all of the supplied methanol aqueous solution does not soak into the anode current collector 101, but the remaining methanol aqueous solution is guided into the methanol aqueous solution container 110 from the methanol discharge port 108 by way of a fuel pipe 126.

On the other hand, the air taken in from the oxidizer supply port 113 by the air supply pump 116 flows through a groove of the cathode fluid channel plate 112, that is, the cathode fluid channel 115, and soaks into the cathode catalyst layer 104. The remaining air is guided into the methanol aqueous solution container 110 from the oxidizer discharge port 114 by way of an exhaust pipe 127. Reference numeral 128 is a fuel cartridge, and when the methanol concentration in the methanol aqueous solution container is lowered, for example, 98% concentration methanol is supplied from this cartridge.

Reference numeral 129 is a gas-liquid separation member, and evaporates steam or the like out of components introduced into the methanol aqueous solution container through the exhaust pipe 127. Reference numeral 130 is a pressure regulating valve, which has a function of lowering the internal pressure to about an atmospheric pressure when the internal pressure in the methanol aqueous solution container 110 is raised.

A film having a high proton conductivity, such as Nafion membrane, is used as the electrolyte layer 105. The catalyst used in the anode catalyst layer 102 is, for example, PtRu of low toxicity, and Pt is used, for example, as the catalyst used in the cathode catalyst layer.

In the direct methanol fuel cell power generating device having such structure, methanol aqueous solution is supplied into the anode catalyst layer 102, protons are generated by catalytic reaction, and the generated protons pass through the electrolyte layer 105, and react with the oxygen supplied in the cathode catalyst layer 104 on the catalyst, thereby generating electromotive force.

Referring next to FIG. 2, an embodiment of the invention is described. The DMFC system 200 mainly comprises a DMFC power generating device 100, a power generating unit 201 which supplies fuel and air into the DMFC power generating device 100, an output unit 202 which checks an output from the DMFC power generating device 100 and supplies to a load and a secondary battery, a power generation assist unit 203 which supplies the power generation output, secondary battery output and external power source output to a pump of the power generating unit, and an electric controller 204 which detects the voltage, current and temperature of the units and controls the units electrically.

The power generating unit 201 comprises the DMFC power generating device 100, a liquid supply pump 111 which supplies methanol in the methanol aqueous solution container 110 into the DMFC power generating device 100, a motor 111m which drives the liquid supply pump 111, an air supply pump 116 which supplies external air into the DMFC power generating device 100, and a motor 116m which drives the air supply pump. In the methanol aqueous solution container 110, methanol aqueous solution of high concentration of predetermined concentration, for example, concentration of 98% (95% or more and less than 100%) is supplied from the fuel cartridge 128, and a memory (EEPROM) 218 described later is fixed to the outside of this fuel cartridge. The memory stores therein various specifications such as the ID, concentration of the methanol aqueous solution contained herein, volume of the container, and size of inlet and outlet.

An output unit 202 comprises a switch S21 connected to an output terminal of the DMFC power generating device 100, an IV measuring unit 206 that is connected between the other end of the switch and the ground and measures the current-voltage characteristic described later, a switch S22 connected to one end of the IV measuring unit 206, electric power output unit 207 connected to the other end of the switch S22, a Schottky barrier type diode D21 having its anode connected to the other end of the same switch S22, a secondary battery charge controller 208 having its input terminal connected to a cathode of the diode D21, a Schottky barrier type diode D22 having its anode connected to the output terminal of the secondary battery charge controller 208 and its cathode connected to the output terminal of the electric power output unit 207, a switch S23 having one end connected to a cathode of this diode D22, and a capacitor C21 connected between the other end of the switch S23 and the ground.

Figure 11:
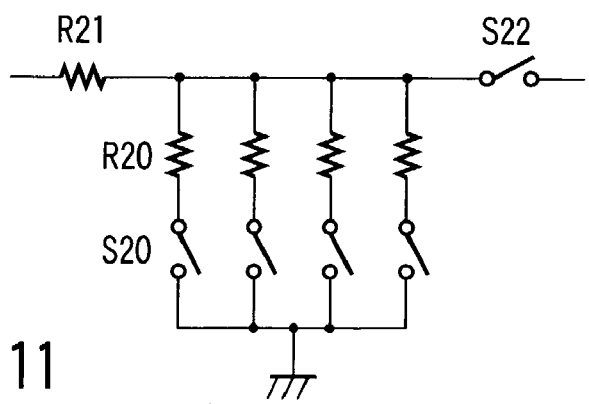
FIG. 11 is a diagram explaining one configuration example of a variable resistor in the embodiment of the invention.

The IV measuring unit 206 comprises a resistor R21 connected between the switch S21 and the switch S22, a resistor R20 connected in series to the ground at the switch S22 side, and a switch S20. A variable resistor can be used as the resistor 20. An example of variable resistor is shown in FIG. 11. Plural resistors 20 different in value are connected parallel to the resistor 21 and in a mutually exchangeable state. Each of the switches S20 is connected in series to each of the resistors 20. The other end of each switch 20 is grounded. The resistor R21 has a small resistance which detects a current of, for example, tens of milliohms, and the resistor R20 has a resistance which is at least 10 times larger than the resistance of the resistor R21.

When measuring the current-voltage characteristic, the switch S22 is turned off, and the corresponding switch S20 is sequentially turned on so as to change over the plural resistors R20. At this time, a voltage drop is measured between the resistor R20 and resistor R21 corresponding to the switch S20 in ON state, or at both ends of the resistor 21, and the current is calculated. The resistor R20 is changed by changing over the switch S20, and when an electric current flows in the resistors R21, R20 and switch S20, the output voltage of the DMFC power generating device 100 can be measured, and the current-voltage characteristic is measured. The output voltage of the DMFC power generating device 100 is measured by a voltage detector connected between the switch S21 and the ground, as shown, for example, in FIG. 2. An output voltage may be also obtained by measuring the potential difference between the anode terminal and the cathode terminal of the DMFC power generating device 100.

On the other hand, the power generation assist unit 203 comprises a Schottky barrier type diode D24 having its cathode connected to the cathode of the diode D21 and its anode connected to an external power source, a voltage adjusting unit which drives auxiliary machine 211 having its input terminal connected to the cathode of the diode, a Schottky barrier type diode D25 having its cathode connected to the output terminal of the voltage adjusting unit for auxiliary machine 211, a switch S24 having its one end connected to the anode of the diode D25 and its other end connected to the anode of the diode D22, a secondary battery SB1 connected between the other end of the switch S24 and the ground, a liquid supply pump drive unit 212 that has its input terminal connected to the output terminal of the voltage adjusting unit for auxiliary machine 211 and moves the motor 111m, and an air supply pump drive unit 213 that has its input terminal connected to the output terminal of the voltage adjusting unit for auxiliary machine 211 and moves the motor 116m.

The electric power output unit 207, liquid supply pump drive unit 212, and air supply pump drive unit 213 comprises DC/DC converters.

The electric controller 204 comprises a voltage regulator 215 which adjusts the voltage supplied from any one of the diodes D21, D24 and D25, a central processing unit (CPU) 215a driven by the voltage regulator 215, an analog processing unit 216 which receives analog values of the current I and voltage V measured by the IV measuring unit 206 and temperature T of methanol aqueous solution, and supplies their digital values into the CPU, a memory (EEPROM) 217 which stores various data and characteristic values, and a bus 219 which exchanges signals among the memory 217, CPU and memory (EEPROM) 218 that is attached to the fuel cartridge 128. The memory 217 stores the amount of the methanol aqueous solution supplied from the liquid supply pump 111, the amount of air supplied from the air supply pump 116, temperature, and other control information. The bus 219 is I$^2$C bus or SM bus, and parameters stored in the memories 217, 218 are transmitted to a host computer connected to other end of the bus. The CPU and memory 218 may not be connected by wire, but signals can be transmitted by wireless mechanism such as radio wave, light or electromagnetic coupling.

The analog processing unit 216 has a function of processing analog values of measured voltage (V), current (I) and temperature (T), and converts these analog measured values into digital values, and supplies into the CPU 215a. The temperature (T) inputted in the analog processing unit 216 is the temperature measured in the cell of the DMFC shown in FIG. 1, for example, the temperature of the separator at the position of half number of the number of series unit cells. Because this separator is likely to achieve the highest temperature.

Figure 5:
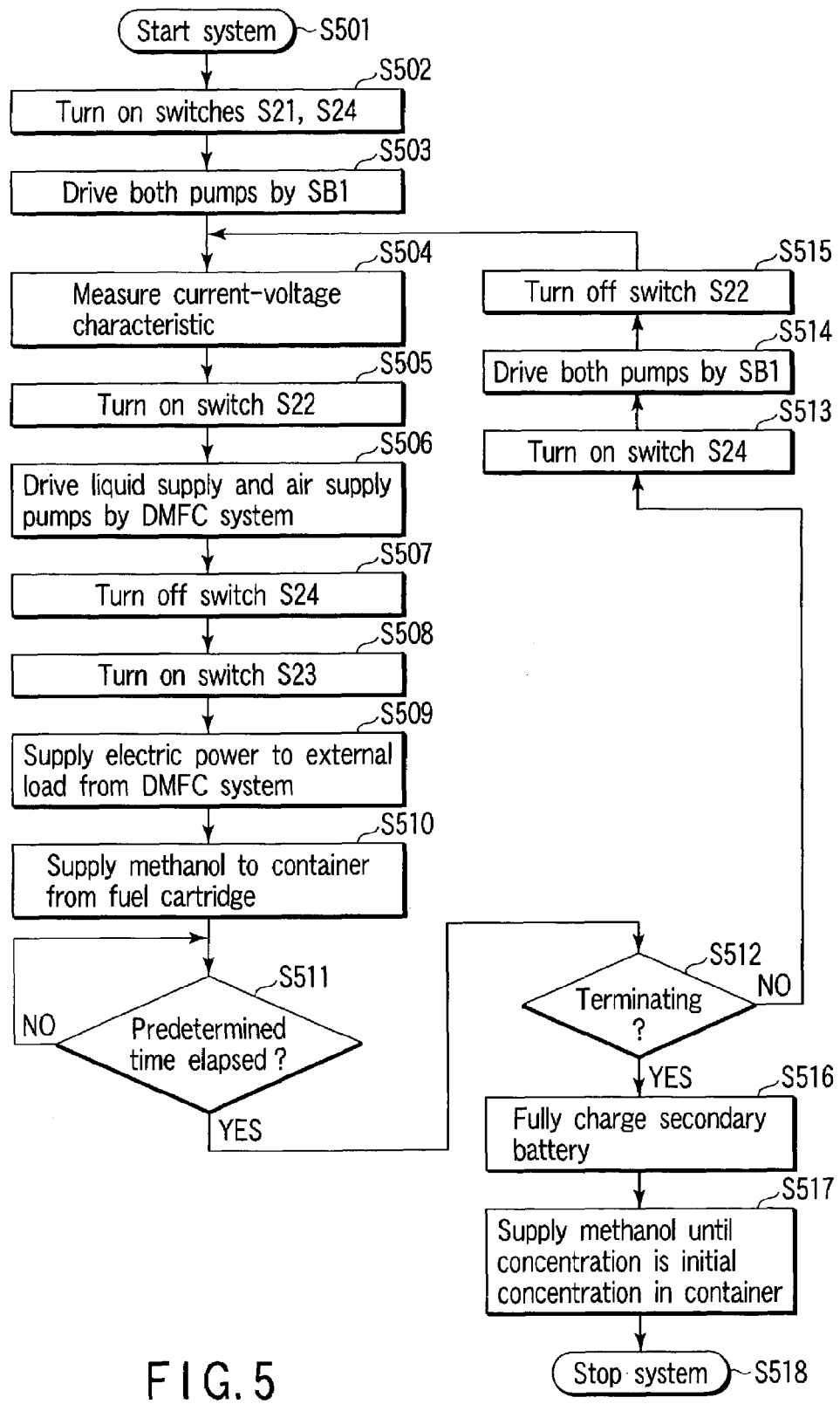
FIG. 5 is a flowchart for explaining the operation in the embodiment of the invention.

First, a starting operation of the system of the embodiment is explained. Before start, all switches S21 to S24 are open (OFF state). When started as shown in step S501 in FIG. 5, the CPU 215a controls the switch S21 and switch S24 in step S502, and closes these switches (ON state). When the switch S24 is closed, electric power is supplied from the secondary battery SB1 into the liquid supply pump drive unit 212 and air supply pump drive unit 213 by way of the diode D25. As a result, the motor 111m and motor 116m start operation, and the liquid supply pump 111 and air supply pump 116 are put in operation (step S503).

The liquid supply pump 111 supplies the methanol aqueous solution of predetermined concentration in the methanol aqueous solution container 110 into the methanol supply port 107 shown in FIG. 1 of the DMFC power generating device 100. The air supply pump 116 supplies external air into the oxidizer supply port 113 shown in FIG. 1 of the DMFC power generating device 100. As the methanol aqueous solution flows in the anode fluid channel 109 and air flows in the cathode fluid channel 115, a chemical reaction takes place, and an electromotive force is generated.

Figure 3:
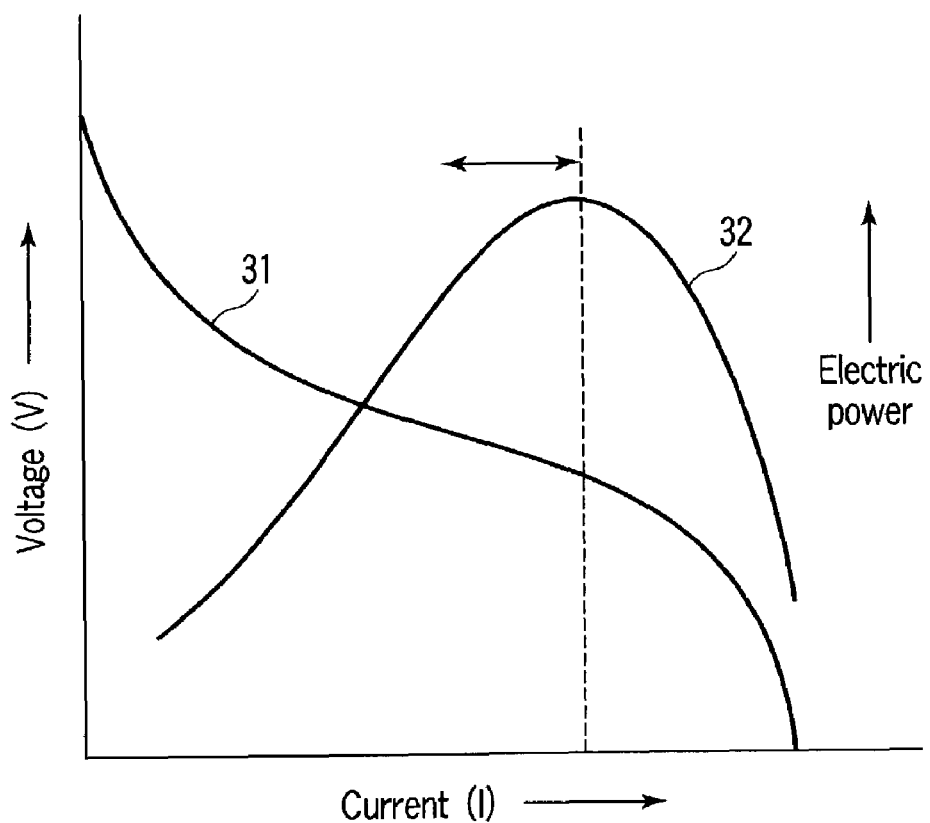
FIG. 3 is a diagram for explaining the current-voltage characteristic in the embodiment of the invention.

As the electromotive force increases, the CPU 215a detects that the output voltage of the DMFC power generating device 100 is heightened as the input from the analog processing unit 216, and the IV measuring unit 206 measures the current value flowing in the resistor R21 and the voltage generated by this current (step S504). At this time, by changing over the resistor to change the resistance value from large to small, the current value changes from small to large, and by measuring the voltage at this time, a current-voltage characteristic is obtained. An example of current-voltage characteristic obtained at this time is shown in FIG. 3.

In this diagram, reference numeral 31 is a current-voltage characteristic diagram, and 32 is a curve showing the electric power. In this electric power curve, unless the operation point is within the range of the initial value to maximum value, electric power cannot be supplied stably to an external load. Therefore, this current-voltage characteristic is investigated occasionally, and the current is monitored such that the current of the output of the DMFC power generating device 100 may always settle within this range.

If the output current of the DMFC flows higher than this range only for a moment, the output voltage of the DMFC power generating device 100 may not be reset, and therefore the switch S22 is turned off to change over so as to supply the electric power to the external load from the secondary battery SB1 by way of the diode D22. In a predetermined time, the output voltage of the DMFC power generating device 100 is recovered, and hence by measuring the current-voltage characteristic again by the IV measuring unit 206, the switch S22 is turned on, and supply of electric power to the external load is changed over from the secondary battery SB1 to the DMFC power generating device 100.

Figure 4A:
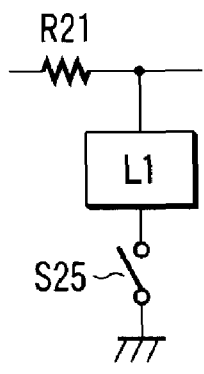
FIG. 4A is a diagram explaining another configuration example of an IV characteristic measuring unit in the embodiment of the invention.
Figure 4B:
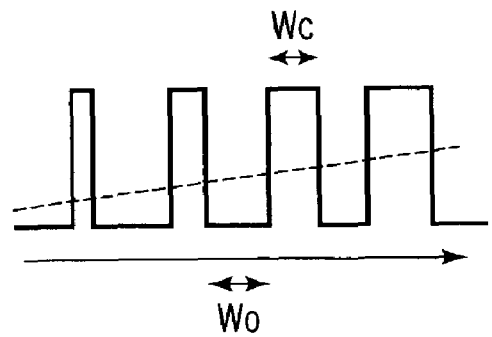
FIG. 4B is a diagram explaining another configuration example of an IV characteristic in the embodiment of the invention.

As the variable resistor contained in the IV measuring unit 206, for example, a circuit as shown in FIG. 4A may be used. That is, the switch S25 is connected in series to the load (L1) including the resistor and inductor, and this switch S25 is controlled by the signal of the pulse width modulation (PWM) changing in width from large to small as shown in FIG. 4B. The resistor R21 is the same as the resistor R21 in FIG. 2. Instead of the load L1, a load which does not contain inductance may be also used. At this time, by varying the resistance value of the load by a signal of pulse width modulation (PWM), the load can be used as a variable resistor.

As a result, the time width Wc of the conductive state of one period is changed from small to large, and the time width Wo of cut-off state is changed from large to small, thereby increasing the average current. By measuring the voltage value when the current value is changed from small to large, a current-voltage characteristic curve is obtained. According to the IV measuring unit shown in FIG. 4A, it is advantageous that the current-voltage characteristic can be obtained by a simple structure and in a short time.

Thus, by measuring the initial current-voltage characteristic curve, when the electromotive force of the DMFC power generating device 100 increases, the CPU 215a turns on the switch S22 (step S505). When the switch S22 is turned on, electric power is supplied to the voltage adjusting unit for auxiliary machine 211, and the motors 111m and 116m are driven by the liquid supply pump drive unit 212 and air supply pump drive unit 213. Therefore, by the electromotive force of the DMFC power generating device 100, the liquid supply pump 111 and air supply pump 116 are put in action (step S506). In the next step S507, the switch S24 is turned off.

On the other hand, since the switch S24 is in the OFF state, electric power is not supplied from the secondary battery SB1, and the secondary battery charge controller 208 is operated through the diode D21, and the secondary battery SB1 is charged.

When the electric power supplied from the electric power output unit 207 becomes more than a predetermined value, the switch S23 is turned on (step S508), and the electric power induced in the DMFC power generating device 100 is supplied to the external load, and a stationary state is established.

While supplying electric power to the external load, if the external load suddenly becomes large, the output voltage may be lowered for a short time, but in such a case, the electric power is supplied to the external load from the continuously-charged capacitor C21, so that voltage fluctuations can be suppressed. If the external load stays large longer than the period estimated above, the diode D22 is put in action to actuate the secondary battery SB1, so that the electric power is also supplied to the external load from this battery (S509).

When aforementioned stationary state continues, the methanol aqueous solution supplied from the methanol aqueous solution container 110 into the DMFC power generating device 100 decreases. Generally, consumption of methanol is proportional to the current flowing in the small resistor R21, and its duration.

As shown in FIG. 1, when the remaining methanol aqueous solution is returned from the fuel pipe 126 into the methanol aqueous solution container and recycled, the consumption of methanol is suppressed, but since the methanol aqueous solution is consumed while flowing in the anode fluid channel, the methanol concentration in the methanol aqueous solution container 110 is diluted. Accordingly, the fuel cartridge 128 containing methanol aqueous solution at predetermined concentration is fitted to the fuel supply port of the methanol aqueous solution container 110, and methanol is supplied (step S510). At this time, from the memory 218 fixed to the fuel cartridge 128, various information about the fuel cartridge such as the ID, type and concentration of methanol aqueous solution, and aperture of inlet and outlet can be transmitted to the CPU by wired or wireless mechanism.

In this system, while generating power, the current-voltage characteristic is measured, for example, every hour or at a specified time. That is, checking whether or not the predetermined time has passed in step S511, if passed, it is checked whether or not to terminate in step S512, and when not terminating, the current-voltage characteristic is measured again. This operation is explained. First, the switch S24 is turned on (step S513), and the liquid supply pump and air supply pump are driven by the secondary battery SB1 (step S514).

In step S515, the switch S22 is turned off, and the current-voltage characteristic is measured. That is, after turning on the switch S20 of the IV measuring unit 206, the resistor R21 is changed over and varied, and the current-voltage characteristic shown in FIG. 3 is measured. On the other hand, electric power is supplied to the external load from the secondary battery SB1 through the diode D22, and supply of electric power to the external load is not stopped.

Since the current-voltage characteristic changes according to the concentration of methanol aqueous solution supplied in the DMFC power generating device 100 and other circumstances, the measured current-voltage characteristic is different from the current-voltage characteristic measured upon start of power generation. In this DMFC system, however, without stopping the supply in the midst of supply of electric power to the external load, the current-voltage characteristic is measured regularly, so that the true electric power that can be supplied to the external load can be always known.

The terminating operation of the DMFC system of this embodiment is explained. To terminate the system in step S512 in FIG. 5, the secondary battery SB1 is fully charged in step S516. In next step S517, methanol aqueous solution is supplied from the fuel cartridge 128 so that the methanol concentration may be the initial concentration in the methanol aqueous solution container 110. After this process, the switch S24 is turned off and the liquid supply pump and air supply pump are stopped, and the DMFC system of this embodiment is stopped.

In case the secondary battery SB1 is not fully charged upon start of this DMFC system, electric power is supplied from outside through the diode D24, and the motors 111m, 116m are driven by the liquid supply pump drive unit 212 and air supply pump drive unit 213 by the auxiliary machine driving voltage regulator 211, and methanol aqueous solution and air are set into the DMFC power generating device, and power is generated. As shown in FIG. 2, the cathodes of the diodes D21, D24, D25 are connected to the voltage regulator 215, and electric power of the CPU 215a is supplied from the voltage regulator 215, and therefore the CPU 215a operates always from start till end of this DMFC system.

In this embodiment, the fuel cartridge 128 containing methanol aqueous solution of high concentration of about 98% is connected to the methanol aqueous solution container 110, and this concentrated methanol aqueous solution is supplied into the container. By using such a fuel cartridge containing methanol aqueous solution in high concentration, the fuel cartridge itself can be reduced in size. As the fuel cartridge, however, it is not always required to use a cartridge containing methanol aqueous solution of a constant concentration and constant amount. Various fuel cartridges may be used, such as a large-sized fuel cartridge containing a large amount of methanol or methanol aqueous solution, or a cartridge containing methanol aqueous solution in relatively low concentration.

The concentration and amount of methanol aqueous solution are stored in the memory 218 fixed to the fuel cartridge, and sent to the CPU or host computer together with the information stored in the memory 217, and the supply amount of methanol aqueous solution can be adjusted by the liquid supply pump 111. Thus, by providing the fuel cartridge with the memory 218 storing the parameters of the cartridge, fuel cartridges of different amounts or type may be used.

The information stored in the memory 218 fixed to the fuel cartridge includes a first information about the fuel cartridge and a second information about the fuel stored in the fuel cartridge. And the main purposes of the information are prevention of accidents and detection of remaining amount.

For the first information, the manufacturing date, number of times of insertion and extraction, ID, remaining amount, and failure flag are stored. The manufacturing date is to prevent liquid leakage and accidental breakage, and aged tanks can be eliminated. The number of times of insertion and extraction is to check for deterioration of fuel supply joint and to assure the reliability of electrical contact parts for communication with information stored in the memory, and control errors due to liquid leakage or wrong information can be prevented. The ID is for eliminating pirated products (illegal copies), and preventing accidents due to improper fuel. The memory of remaining amount is to prevent accidents in which power interruption of electronic components by shortage of fuel. The memory of failure flag is to detect the fuel tank in which abnormality is detected to prevent its subsequent use, there by preventing accident.

The information about the fuel stored in the memory 218 includes the remaining amount information, full tank capacity, present amount and concentration. From the memory of full tank capacity, the relative remainder or consumption can be displayed, or the maximum driving time is known when the fuel is replenished. When the present remaining amount is stored, the remaining driving time can be calculated. For example, it is known whether enough driving time is left or not for downloading a huge amount of information, or it is determined whether a spare fuel cartridge is necessary or not. It is also possible to cooperate with suspend, hibernation or resume function, and the application in action can be protected. Further, the weight of the fuel in the fuel cartridge can be stored in the memory 218. And the number of times of replenishment can be stored when one replenishing amount from the fuel cartridge may be constant.

By storing the methanol concentration in the memory 218, a fuel cartridge of a different concentration can be used, and when operated in a high temperature climate, for example, a fuel of low concentration is used, or in a low temperature climate, a fuel cartridge containing methanol aqueous solution of high concentration is used, and thus the fuel cartridges can be exchanged depending on the environments.

Similarly, by providing the system with the memory 217 storing data related to various parameters, the system itself can be replaced, and a flexible system can be built up.

A specific example of information stored in the memory 218 fixed to the fuel cartridge is described in detail. The memory 218 comprises a ROM region in which the information is fixed at the time of shipping and cannot be changed, and a RAM region in which the information can be rewritten during use, and each capacity is 0.5 k bits. Items stored in the ROM region include the manufacturer's name, cartridge name, manufacturing date, maximum capacity of cartridge, fuel concentration, fuel type, maximum number of times of insertion and extraction, maximum liquid supply capacity, minimum operating temperature, maximum operating temperature, and spare items.

The manufacturer's name is, for example, the name registered in the standardization society such as ASCII, and is assigned with a memory capacity of 12 bytes for 16 characters. The cartridge name includes the type name, manufacturing type number, product type number, and lot number, and is assigned with a memory capacity of 16 bytes for 16 characters. The manufacturing date is mainly used for quality control, and a cartridge of an old manufacturing date is rejected, if installed, to prevent accident. The manufacturing date consists of 12 bits of year, 4 bits of month, and 8 bits of day, and a total of 24 bits (3 bytes) is assigned as memory capacity. For example, if the manufacturing date is Dec. 31, 2000, it is 011111010000110000011111 in binary notation, and 7d0c1f in hexadecimal notation. By assigning 3 bytes for this item, the dates can be stored to a maximum of Dec. 31, 4095.

The cartridge maximum capacity refers to the maximum capacity of the fuel to be contained in the fuel cartridge. By assigning this item with 4 bytes in the unit of microliter ($\mu L$), a capacity can be displayed in a range from 0 to 429,496,729 $\mu L$ (about 429 liters). By specifying the item of fuel concentration, a fuel cartridge of a different concentration can be used. In this item, by keeping 1 byte in the unit of 0.1 mol/L, the concentration can be displayed in a range of 0 to 25.0 mol/L. By this item, since the maximum capacity of the fuel can be detected, the remaining driving time or remaining electric power can be detected by referring to the value of other item.

By the item of fuel type, for example, specifying 0 for water and 1 for methanol, other fuel than methanol can be also distinguished. By assigning this item with 1 byte, up to 256 fuel types can be distinguished from 0 to 255.

The maximum number of times of insertion and extraction can be change depending on the structure of junction of fuel cartridge, thereby avoiding risk due to abnormally frequent insertion and extraction operations. In the unit of number of times, when this item is assigned with 2 bytes, the number of times of insertion and extraction can be predetermined from 1 to 65,535 times, and when predetermined at 65,535, for example, it is assumed to be infinite. In the case of one-time disposal fuel cartridge, this item is set at 1, and use of plural times is prohibited to assure safety. The maximum liquid supply capacity is stored in consideration of the capacity of the liquid supply mechanism having a fuel tank. Assigning this time with 2 bytes, in the unit of 10 $\mu L$/min, the maximum liquid supply capacity can be stored up to 655,350 $\mu L$/min (about 0.65 L/min). In the case of a fuel tank without liquid supply mechanism, this value is set at 0, and the type of the tank can be determined by this value.

The minimum operating temperature can be predetermined in a range of 0 to $-128°$ C., for example, when 1 byte is assigned in the unit of degree centigrade, and liquid supply failure due to freezing of fuel in the fuel cartridge can be prevented. The maximum operating temperature can be predetermined in a range of 0 to $127°$ C., for example, when 1 byte is assigned in the unit of degree centigrade, and ignition or smoking of fuel in the fuel cartridge can be prevented.

If a total of 64 bytes can be provided in the ROM region of the memory 218, aside from these items, 17 bytes can be held of spare items. Among spare items, for example, one bit may be used for parity check of the information of the items, and unauthorized alteration of items can be detected. The spare item in the ROM region can be used, together with the spare item in the RAM region, as information for distinguishing the ID, pirated parts, etc.

The RAM region in the memory 218 stores, for example, the remaining fuel capacity, number of times of insertion and extraction of fuel cartridge, duration of use, failure flag, and spare items. These items can be rewritten when the fuel cartridge is inserted in or extracted from the methanol aqueous solution container.

The remaining capacity shows the remaining capacity of fuel at the time of use, and is assigned with 4 bytes in the unit of microliters ($\mu L$), and the remaining capacity can be stored in a range of 0 to 4,294,967,295 $\mu L$ (about 429 liters). In the mechanism of the fuel cell, if only the number of times of fuel supplying is counted, the control microcomputer converts the count value into the consumption of fuel, and by subtracting from the cartridge maximum capacity stored in the ROM region or the value of this item stored before use, the remaining capacity can be calculated, and this value is stored again as the value of this item. The value of the remaining capacity can be expressed also in percentage as relative capacity, by referring to the cartridge maximum capacity stored in the ROM region.

When the fuel cartridge is replenished with fuel, the remaining capacity value is updated by adding the replenishing amount. By this function, an arbitrary amount of fuel can be added. When filling with fuel by a predetermined replenishing device, the remaining capacity of the device is read from the memory, and the replenishing amount and remaining capacity can be calculated and stored accurately. If replenished with fuel illegally, the memory content is not updated and the remaining capacity becomes 0, and therefore illegal use can be prevented and stable action can be maintained.

The number of times of inserted and extracting the fuel cartridge is stored, and when this value reaches the maximum number of times of insertion and extraction stored in the ROM, the corresponding fuel cartridge cannot be used any longer. The number of times of insertion and extraction is counted by adding +1 by the control microcomputer every time the fuel cartridge is extracted and inserted. The unit of this time is the number of times, and by assigning with 2 bytes, the number of times of insertion and extraction can be stored in a range of 0 to 65,535 times, and the maximum value of 65,535 may be set to be infinite. When the maximum value is set to 65,535, the fuel cartridge can be recycled many times.

The operation time is the cumulative time of the fuel cartridge installed in the DMFC power generating device, and judges and displays the exchange of the fuel cartridge by the fuel microcomputer from the temperature history, state of use, manufacturing date, fuel temperature and fuel type. When this item is assigned with 4 bytes, for example, in the units of hours (h), the operation time can be stored for a maximum of 65,535 h (about 7 and a half years). The fuel cartridge may be recycled, but by determining the upper limit (maximum operation time) of the operation time and storing in the ROM region, the limit of the recycling cartridge may be determined by comparing this value with the operation time.

The failure flag item stores the history of various abnormal states. When this item is assigned with 8 bytes, a maximum of 64 bits, that is, 64 types of abnormal state can be stored. As an abnormal state, for example, if the fuel methanol is not delivered by operating the fuel cell, or an abnormal amount of fuel is delivered, it can be stored as a specific bit of a failure flag. Since the fuel stored in the fuel cartridge is usually a methanol aqueous solution of high concentration, storage of history of this failure flag is very important from the viewpoint of safety. When a capacity of 64 bytes is assured in the RAM region, the remaining 46 bytes can be used for the spare items.

In this embodiment, all items above are stored in the memory 218 fixed to the fuel cartridge 128. However, in the methanol aqueous solution container 110, too, a memory such as an EEPROM can be fixed. Thus, when a memory is installed in the methanol aqueous solution container 110, it is also divided into the ROM region and RAM region, and all of these items, or specific items such as container manufacturing date, maximum liquid supply capacity, and operation time may be stored in the memory. By installing the memory also in the methanol aqueous solution container and storing the attributes of the container, it is easier to replace the methanol aqueous solution container itself.

In this embodiment, the methanol aqueous solution not reacted in the DMFC power generating unit, and water, steam and carbon dioxide passing through the cathode passage are all returned to the methanol aqueous solution container, and methanol is supplied from the fuel cartridge. However, this is not always necessary in the invention. For example, as shown in FIG. 6A, a fuel cartridge 61 containing spare methanol aqueous solution and a methanol aqueous solution container 62 are integrally composed, and when supplying methanol aqueous solution into the DMFC power generating device, spare methanol aqueous solution is put into the container 62, or as shown in FIG. 6B, the methanol aqueous solution left over in the DMFC power generating device 63 is returned to a methanol aqueous solution container 64, and water and steam generated by chemical reaction during power generation are condensed by a condenser 66, and only water can be returned to the fuel cartridge 65 and methanol aqueous solution container 64. Further, such a fuel cartridge 65 can be integrated with the methanol aqueous solution container 64.

In the explanation of the embodiment, electric memories are used, but any other memories may be used as long as the information can be stored, and the information may be stored in a magnetic recording medium, or stored by mechanical method such as punching, notching or marking, and such mechanical memories are also included as memories in the invention.

In the invention, to start the pump in the first place, a secondary battery is used, and by using the secondary battery, when electric power is supplied to the load from the power generating device, it can be charged, and the time until independent charging can be extended. However, in the invention, the battery is not limited to the secondary battery, and generally any auxiliary battery may be used until a sufficient power is generated by the power generating unit.

Other aspects of the invention are a direct methanol fuel cell system comprising a power generating unit including an anode electrode, a cathode electrode, and an electrolyte layer provided between the anode electrode and the cathode electrode, a fuel tank for storing a fuel containing methanol to be supplied to the anode electrode, and a fuel cartridge including a spare fuel tank for storing the fuel to be replenished in the fuel tank, and a harmful substance trap member for capturing harmful substance in the gas in the fuel tank.

Figure 7:
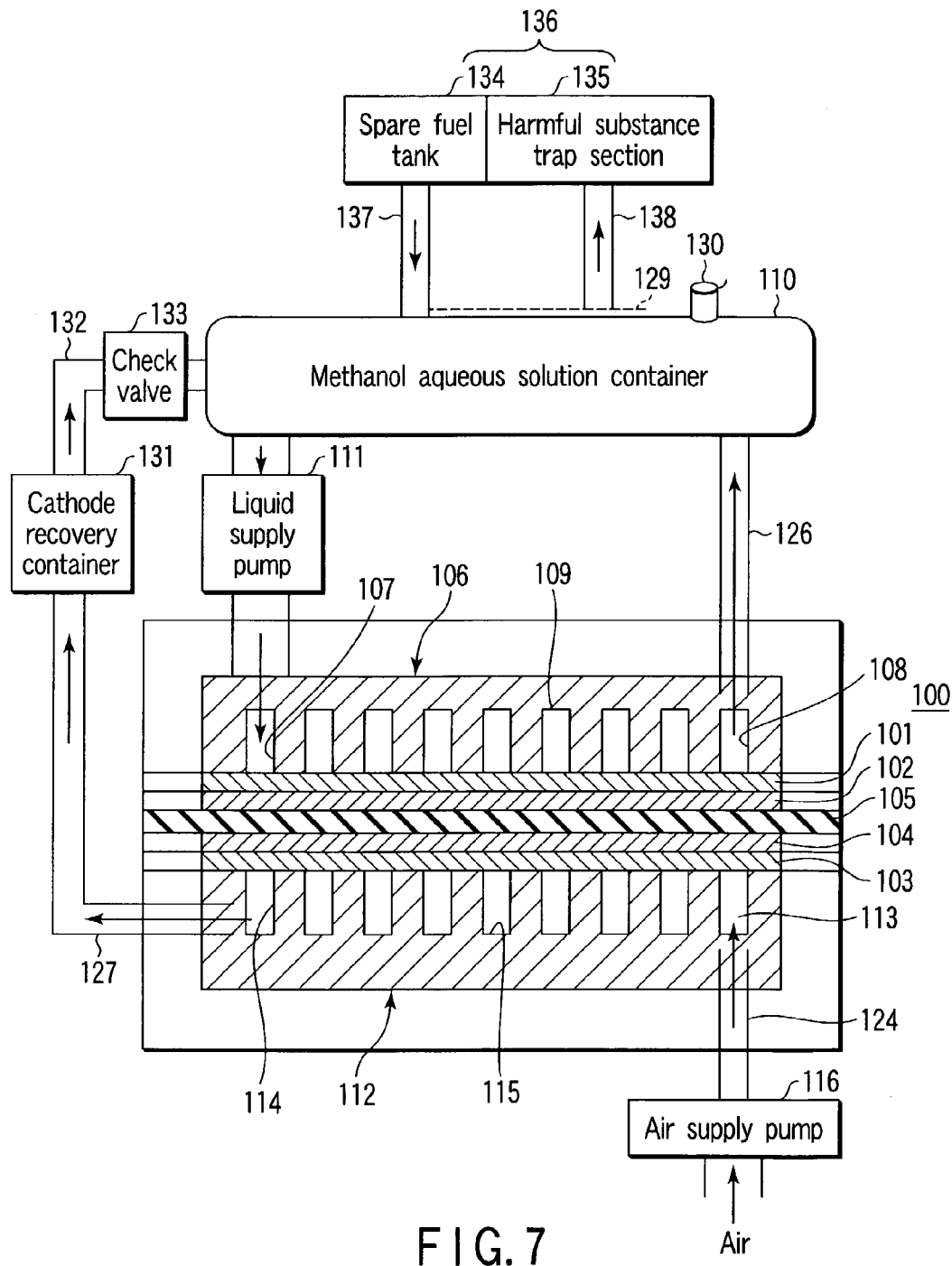
FIG. 7 is a schematic diagram showing an example of another direct methanol fuel cell system according to the invention.
Figure 9:
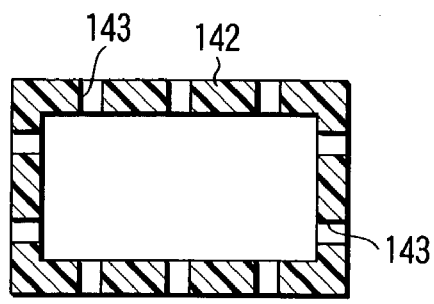
FIG. 9 is a cross sectional view showing a gas diffusion path of the harmful substance trap member in FIG. 8.

An embodiment of the direct methanol fuel cell (DMFC) system in another aspect of the invention is explained by referring to FIG. 7 to FIG. 9. In FIG. 7 to FIG. 9, the same members as explained in FIG. 1 are identified with the same reference numerals, and a duplicate explanation is omitted.

This DMFC system further comprises a cathode recovery container 131. This cathode recovery container 131 is connected to a cathode piping 132, and is also connected to a methanol aqueous solution container 110 by way of a cathode piping 132. The cathode piping 132 has a check valve 133 to prevent counterflow of the liquid in the cathode recovery container 131.

In the cathode recovery container 131, water is contained before start of power generation, and the exhaust pipe 127 is connected below the liquid level, and hence the gas exhausted from the cathode electrode is bubbled in water. From the cathode electrode, unreacted methanol, water, air, carbon dioxide, formaldehyde, and formic acid are discharged, and part of formaldehyde and formic acid are bubbled and dissolved in the water in the cathode recovery container 131. The water in which the cathode product is dissolved is collected in the methanol aqueous solution container 110 from the cathode recovery container 131 by way of the piping 132. Along with the recovery, the gas in the cathode recovery container 131 is also sent into the methanol aqueous solution container 110.

The gas-liquid separator 129 is fixed, for example, in the inner wall of the methanol aqueous solution container 110. The gas-liquid separator 129 is formed of porous material such as nonwoven fabric. The gas-liquid separator 129 passes only the gas collected in the methanol aqueous solution container 110.

A second fuel cartridge 136 includes a spare fuel tank 134 and a harmful substance trap member 135 externally attached to the spare fuel tank 134. The second fuel cartridge 136 is detachably connected to the methanol aqueous solution container 110. In the spare fuel tank 134, methanol aqueous solution is contained. The methanol concentration of the methanol aqueous solution in the spare fuel tank 134 is preferred to be higher than the methanol concentration of the methanol aqueous solution in the methanol aqueous solution container 110, and specifically in a range of 95% or more to less than 100%. The spare fuel tank 134 is connected to the methanol aqueous solution container 110 by way of a liquid supply pipe 137. When the methanol concentration of the methanol aqueous solution in the methanol aqueous solution container 110 is diluted, methanol aqueous solution is supplied from the spare fuel tank 134, and the methanol concentration of the methanol aqueous solution in the methanol aqueous solution container 110 can be maintained at a constant value.

The harmful substance trap member 135 is connected to the gas-liquid separator 129 by way of an air supply pipe 138. An example of the harmful substance trap member 135 is explained by referring to FIG. 8 and FIG. 9.

The harmful substance trap member 135 includes a trap material container 140 (made of resin such as acrylic plate) having a gas exhaust port 139. In the trap material container 140, a gas pipe (gas diffusion passage) 142 having a gas inlet port 141 is provided. The gas pipe 142 is made of resin such as acrylic plate, and has a meandering shape. To prevent the gas exhausted from the gas-liquid separator 129 from being released outside through the gas exhaust port 139 directly without diffusing in the harmful substance trap material, the terminal end of the gas pipe 142 does not communicate with the gas exhaust port 139. In the gas pipe 142, as shown in FIG. 9, plural gas diffusion holes 143 are opened. A harmful substance trap material 144 fills up the gap between the inner wall of the trap material container 140 and the outer wall of the gas pipe 142. The harmful substance trap material 144 contains at least one powder of active carbon and silica gel. In particular, active carbon is preferred. This is because many functional groups such as hydroxyl group and carboxyl group are present on the surface of the active carbon, and organic substances such as formaldehyde and formic acid can be trapped easily.

By the harmful substance trap member 135 having such structure, the gas passing through the gas-liquid separator 129 is introduced into the gas pipe 142 from the gas inlet port 141 through the air supply pipe 138, and is diffused into the harmful substance trap material 144 from the gas diffusion holes 143. Organic substances such as formaldehyde and formic acid are easily adsorbed on the active carbon of the harmful substance trap material 144. As a result, harmful substances such as formaldehyde and formic acid can be removed from the exhaust gas. The exhaust gas being rid of harmful substances is released outside through the gas exhaust port 139.

When methanol aqueous solution is used up in the spare fuel tank 134 of the second fuel cartridge 136, it is replaced with a new fuel cartridge, and in this fuel cartridge, a sufficient amount of fuel is contained in the spare fuel tank, and the harmful substance trap member 135 is replenished with unadsorbed harmful substance trap material 144, so that the harmful substance trap member 135 can be always maintained in the harmful substance adsorbing state by replacing the fuel cartridge. As a result, release of harmful substance to outside from the fuel cell system can be avoided, and the impact on the environment is reduced, and safety for the human body may be enhanced.

The replenishing amount of the harmful substance trap material 144 is preferred to be set so that the trap material 144 may be break through when the methanol aqueous solution is nearly used up in the spare fuel tank 134. As a result, the wasteful amount of the trap material 144 may be kept to a minimum, and the adsorption capacity of the trap material 144 may be maintained during the operation of the DMFC system.

Figure 10:
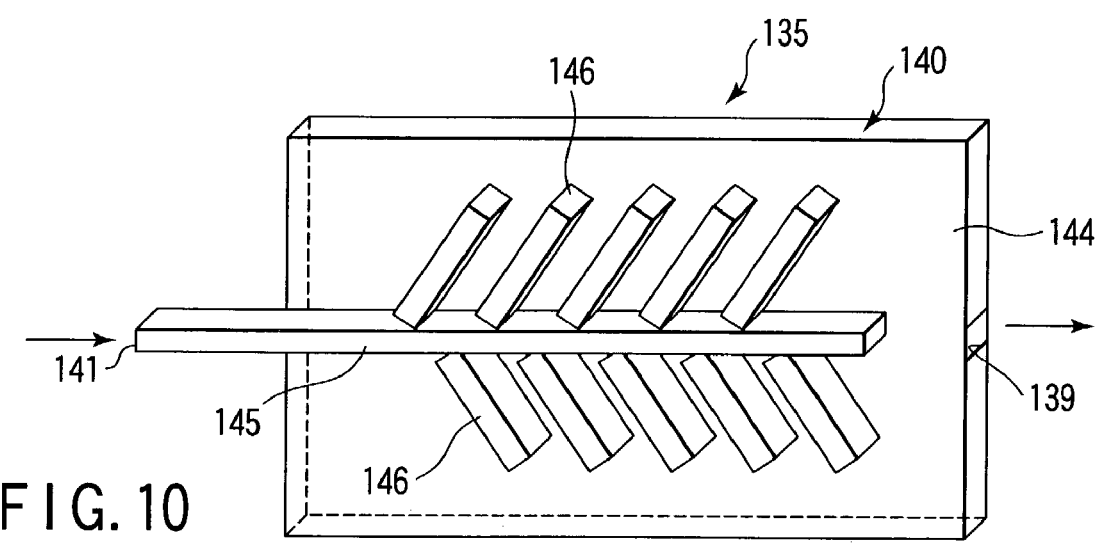
FIG. 10 is a perspective view schematically showing another example of the harmful substance trap member of the direct methanol fuel cell system in FIG. 7.

In FIG. 8, a meandering pipe is used as the gas pipe 142, but the pipe shape is not particularly limited as long as the gas diffusion speed into the harmful substance trap material 144 may be enhanced. For example, as shown in FIG. 10, two or more branch pipes 146 may be connected to a main piping 145 having a gas inlet port 141. Gas diffusion holes are preferred to be opened in the pipings 145, 146 as shown in FIG. 9. To prevent the gas exhausted from the gas-liquid separator 129 from releasing outside from the gas exhaust port 139 without diffusing in the harmful substance trap material 144, the terminal ends of the pipings 145, 146 do not communicate with the gas discharge port 139.

On the outer surface of the spare fuel tank 134 of the second fuel cartridge 136 or on the outer surface of the trap material container 140 of the harmful substance trap member 135, the memory (EEPROM) 218 can be fixed. By recording the parameters having the harmful substance trap material 144 (such as trap member replenishing amount) in the memory 218, in addition to the parameters of the spare fuel tank 134, replacement of fuel cartridge can be indicated at the timing of breaking through the harmful substance trap material 144.

Examples of the invention are described in detail below while referring to the accompanying drawings.

EXAMPLE 1

<Fabrication of Anode Electrode>

Perfluorocarbon sulfonic acid solution and ion exchange water were added to carbon black carrying catalyst for anode (Pt:Ru=1:1), and this catalyst carrying carbon black was dispersed, and paste was prepared. The paste was applied on carbon paper with water repellent treatment as anode current collector, and dried to form an anode catalyst layer, and an anode electrode was obtained.

<Fabrication of Cathode Electrode>

Perfluorocarbon sulfonic acid solution and ion exchange water were added to carbon black carrying catalyst for cathode (Pt), and this catalyst carrying carbon black was dispersed, and paste was prepared. The paste was applied on carbon paper with water repellent treatment as cathode current collector, and dried to form a cathode catalyst layer, and a cathode electrode was obtained.

<Preparation of Membrane-electrode Assembly (MEA)>

A perfluorocarbon sulfonic acid membrane was arranged as electrolyte membrane between the anode catalyst layer of anode electrode and the cathode catalyst layer of cathode electrode, and by applying hot press, the anode electrode, electrolyte membrane and cathode electrode were joined, and a membrane-electrode assembly was obtained.

<Fabrication of Harmful Substance Trap Member>

A trap material container of acrylic resin having a structure as shown in FIG. 8 was prepared. The space between the inner wall of the container and the outer wall of the gas pipe was replenished with active carbon as a harmful substance trap material, and a harmful substance trap member was obtained.

Using the obtained membrane-electrode assembly and harmful substance trap member, a direct fuel cell system having a structure as shown in FIG. 7 was assembled.

EXAMPLE 2

A direct fuel cell system having the same structure as in example 1 was assembled except that silica gel was used as the harmful substance trap material.

In the direct fuel cell systems of example 1 and example 2, methanol aqueous solution was supplied in the anode electrode, air was supplied in the cathode electrode, and a load current of 150 mA/cm$^2$ was applied for 1 hour while keeping the power generating unit at 70° C., and a voltage of about 0.4 V was obtained. During this operation, the concentration of formaldehyde and formic acid released from the gas exhaust port 139 of the harmful substance gas trap member 135 was measured, and a removal rate of over 95% was obtained in both example 1 and example 2 (as compared with the concentration before introduction into the gas trap member 135).

According to the invention, the current-voltage characteristic of the electric power generated in the power generating unit is measured, and the supply of electric power to the external load is controlled according to this characteristic, electric power can be supplied to the load stably for a long period, and therefore a practical direct methanol fuel cell system is obtained.

The invention also presents a direct methanol fuel cell system and fuel cartridge having less load on environments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cartridge to be connected to a fuel tank of a direct methanol fuel cell system, comprising:
   a spare fuel tank which stores a liquid fuel and is to be connected to the fuel tank; and
   a harmful substance trap member which is fixed to the spare fuel tank and to be connected to the fuel tank, and the harmful substance trap member containing a harmful substance trap material which traps gaseous harmful substances exhausted from the fuel tank.

2. The fuel cartridge of claim 1, further comprising a memory which is fixed to the spare fuel tank, and stores at least one of information about the spare fuel tank and information about the fuel.

3. The fuel cartridge of claim 1, wherein the harmful substance trap member includes a trap material container having a gas exhaust port, a gas diffusion passage which is formed in the trap material container, and a gas diffusion hole opened in a wall of the gas diffusion passage, and the harmful substance trap material is filled in a space between the inner side of the trap material container and the wall of the gas diffusion passage.

4. The fuel cartridge of claim 1, wherein the liquid fuel is a methanol aqueous solution.

5. The fuel cartridge of claim 1, wherein the liquid fuel is a methanol aqueous solution having a concentration of a range of 95% or more to less than 100%.

6. The fuel cartridge of claim 1, wherein the harmful substance trap material includes at least one powder of active carbon and silica gel.

7. The fuel cartridge of claim 1, wherein the harmful substance trap material includes active carbon.

* * * * *